(12) United States Patent
Imai et al.

(10) Patent No.: US 11,402,815 B2
(45) Date of Patent: Aug. 2, 2022

(54) CONTROL APPARATUS

(71) Applicant: HITACHI INDUSTRIAL EQUIPMENT SYSTEMS CO., LTD., Tokyo (JP)

(72) Inventors: Mitsuhiro Imai, Tokyo (JP); Yoshinori Mochizuki, Tokyo (JP); Fumiyuki Tamura, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 129 days.

(21) Appl. No.: 17/042,232

(22) PCT Filed: Feb. 28, 2019

(86) PCT No.: PCT/JP2019/007967
§ 371 (c)(1),
(2) Date: Sep. 28, 2020

(87) PCT Pub. No.: WO2019/187965
PCT Pub. Date: Oct. 3, 2019

(65) Prior Publication Data
US 2021/0026316 A1    Jan. 28, 2021

(30) Foreign Application Priority Data
Mar. 29, 2018    (JP) .............................. JP2018-066065

(51) Int. Cl.
*G05B 19/05*    (2006.01)
*G06F 9/455*    (2018.01)
(Continued)

(52) U.S. Cl.
CPC ............. *G05B 19/05* (2013.01); *G06F 9/455* (2013.01); *G06F 9/50* (2013.01); *G06F 9/544* (2013.01)

(58) Field of Classification Search
CPC . G05B 19/05; G06F 9/455; G06F 9/50; G06F 9/544
See application file for complete search history.

(56) References Cited

U.S. PATENT DOCUMENTS

2002/0032891 A1* 3/2002 Yada .................. G06F 11/1068
714/766
2003/0035030 A1* 2/2003 Hamamoto .......... B41J 2/04553
347/57
(Continued)

FOREIGN PATENT DOCUMENTS

JP    2004-362327 A    12/2004
JP    2006-178818 A    7/2006
(Continued)

OTHER PUBLICATIONS

International Search Report of PCT/JP2019/007967 dated May 7, 2019.
(Continued)

*Primary Examiner* — Tuan C Dao
(74) *Attorney, Agent, or Firm* — Mattingly & Malur, PC

(57) ABSTRACT

A control apparatus where control programs and information programs coexist is allowed to change programs flexibly. The control programs and information programs are installed in the control apparatus, which is provided with a shared area. The shared area is an area that at least one control program and at least one information program can access. Shared information is stored in the shared area. The shared information includes at least one of information related to an I/O port accessed by the control programs, and information related to the control program. Each control program is a program that performs scan operation of outputting control information on the relevant control object apparatus coupled to the I/O port accessed for controlling a control object apparatus with respect to the control program,
(Continued)

to this I/O port. Each information program is a program that performs information processing that does not include the scan operation.

10 Claims, 9 Drawing Sheets

(51) Int. Cl.
*G06F 9/50* (2006.01)
*G06F 9/54* (2006.01)

(56) References Cited

U.S. PATENT DOCUMENTS

| | | |
|---|---|---|
| 2004/0226016 A1 | 11/2004 | Sreejith |
| 2006/0206246 A1* | 9/2006 | Walker ................. H04L 63/302 |
| | | 701/16 |
| 2010/0005531 A1* | 1/2010 | Largman ................. G06F 21/53 |
| | | 726/24 |
| 2013/0117522 A1 | 5/2013 | Schreter et al. |
| 2013/0346805 A1* | 12/2013 | Sprouse ............. G11C 16/3431 |
| | | 714/E11.178 |
| 2016/0092325 A1* | 3/2016 | Bar ....................... G06F 3/0619 |
| | | 714/6.1 |
| 2019/0204801 A1 | 7/2019 | Imai et al. |

FOREIGN PATENT DOCUMENTS

| | | |
|---|---|---|
| JP | 2017-182105 A | 10/2017 |
| JP | 2018-041405 A | 3/2018 |
| WO | 2011/125178 A1 | 10/2011 |

OTHER PUBLICATIONS

Extended European Search Report dated Dec. 1, 2021, issue in corresponding EP Application No. 19774733.0.

* cited by examiner

FIG. 3

| PROGRAM NAME | PROGRAM TYPE | TASK PRI-ORITY | EXECU-TION CYCLE | MEMORY UPPER LIMIT | CPU CORE NUMBER | USE DEVICE | EXCLU-SIVE DEVICE |
|---|---|---|---|---|---|---|---|
| CTL001 | CONTROL | 1 | 10ms | 16MB | 0 | DI1,DO1 | DI1,DO1 |
| CTL002 | CONTROL | 0 | 1ms | 8MB | 1 | eth1,eth2, SERIAL1 | eth2, SERIAL1 |
| ITL001 | INFORMA-TION | 5 | - | 32MB | 0 | eth1 | - |
| ITL006 | INFORMATION | 20 | - | 16MB | 0 | eth1 | - |
| ... | ... | ... | ... | ... | ... | ... | ... |

FIG. 6A

| PROGRAM NAME | PROGRAM TYPE | TASK PRIORITY | EXECUTION CYCLE | MEMORY UPPER LIMIT | CPU CORE NUMBER | USE DEVICE | EXCLUSIVE DEVICE |
|---|---|---|---|---|---|---|---|
| CTL007 | CONTROL | 0 | 10ms | 32MB | 0 | DI1, DO1 | DI1,DO1 |
| ITL007 | INFORMATION | 10 | - | 1MB | 1 | eth1, eth2 | eth2 |
| ITL008 | INFORMATION | 15 | - | 8MB | 0 | eth1 | - |
| ... | ... | ... | ... | ... | ... | ... | ... |

FIG. 6B

| PROGRAM NAME | PROGRAM TYPE | TASK PRIORITY | EXECUTION CYCLE | MEMORY UPPER LIMIT | CPU CORE NUMBER | USE DEVICE | EXCLUSIVE DEVICE |
|---|---|---|---|---|---|---|---|
| CTL007 | CONTROL | 0 | 10ms | 32MB | 0 | DI1, DO1 | DI1,DO1 |
| ITL007 | INFORMATION | 10 | - | 1MB | 1 | eth1, eth2 | eth2 |
| ... | ... | ... | ... | ... | ... | ... | ... |
| ITL009 | INFORMATION | 5 | - | 8MB | 1 | eth1 | - |
| ... | ... | ... | ... | ... | ... | ... | ... |

FIG. 7

SETTING RANGE TABLE
700

| PARAMETER ITEM | ATTRIBUTE | SETTABLE RANGE | DEFAULT VALUE | SETTING VALUE |
|---|---|---|---|---|
| CPU CORE | A: SET CAREFULLY | 2-8CORES | 5-8CORES | 4-8CORES |
| MEMORY UPPER LIMIT | A: SET CAREFULLY | 16-256MB | 128MB | 160MB |
| TASK PRIORITY | A: SET CAREFULLY | -, 1-54 | -(NON-PRIORITY) | -(NON-PRIORITY) |
| MEASUREMENT CYCLE OF CPU CONTINUOUS EXECUTION TIME | A: SET CAREFULLY | 10ms-1000ms | 100ms | 100ms |
| RATIO OF CONTINUOUS EXECUTION TIME IN MEASUREMENT CYCLE OF CPU CONTINUOUS EXECUTION TIME | A: SET CAREFULLY | 5-80% | 50% | 50% |
| AVAILABLE LAN PORT | A: SET CAREFULLY | LAN2,LAN3, LAN4 | LAN3, LAN4 | LAN2,LAN3, LAN4 |
| EXCLUSIVE LAN PORT | A: SET CAREFULLY | LAN3, LAN4 | LAN4 | LAN4 |
| SHARED FOLDER | B: FREELY SETTABLE | /home/share | -(NOT SHARED) | -(NOT SHARED) |
| ROUTING SCHEME | B: FREELY SETTABLE | Masquerade, Port forward, Ip forward | Masquerade | Masquerade |
| USE PORT NUMBER | B: FREELY SETTABLE | 10000-60000 | -(PORT NOT OPENED) | -(PORT NOT OPENED) |

|  | CONTROL | | | | INFORMATION | | | |
|---|---|---|---|---|---|---|---|---|
| CPU | 1 | 2 | 3 | 4 | 5 | 6 | 7 | 8 |
| MEMORY | 32 MB | 32 MB | 32 MB | 32 MB | 32 MB | 32 MB | 32 MB | 32 MB |
| LAN | LAN1 CONTROL | | LAN2 CONTROL/ INFORMATION | | LAN3 CONTROL/ INFORMATION | | LAN4 INFORMATION | |

FIG. 8B

|  | CONTROL | | | | INFORMATION | | | |
|---|---|---|---|---|---|---|---|---|
| CPU | 1 | 2 | 3 | 4 | 5 | 6 | 7 | 8 |
| MEMORY | 32 MB | 32 MB | 32 MB | 32 MB | 32 MB | 32 MB | 32 MB | 32 MB |
| LAN | LAN1 CONTROL | | LAN2 CONTROL | | LAN3 CONTROL | | LAN4 INFORMATION | |

FIG. 8C

|  | CONTROL | | | | | | INFORMATION | |
|---|---|---|---|---|---|---|---|---|
| CPU | 1 | 2 | 3 | 4 | 5 | 6 | 7 | 8 |
| MEMORY | 32 MB | 32 MB | 32 MB | 32 MB | 32 MB | 32 MB | 32 MB | 32 MB |
| LAN | LAN1 CONTROL | | LAN2 CONTROL/ INFORMATION | | LAN3 INFORMATION | | LAN4 CONTROL/ INFORMATION | |

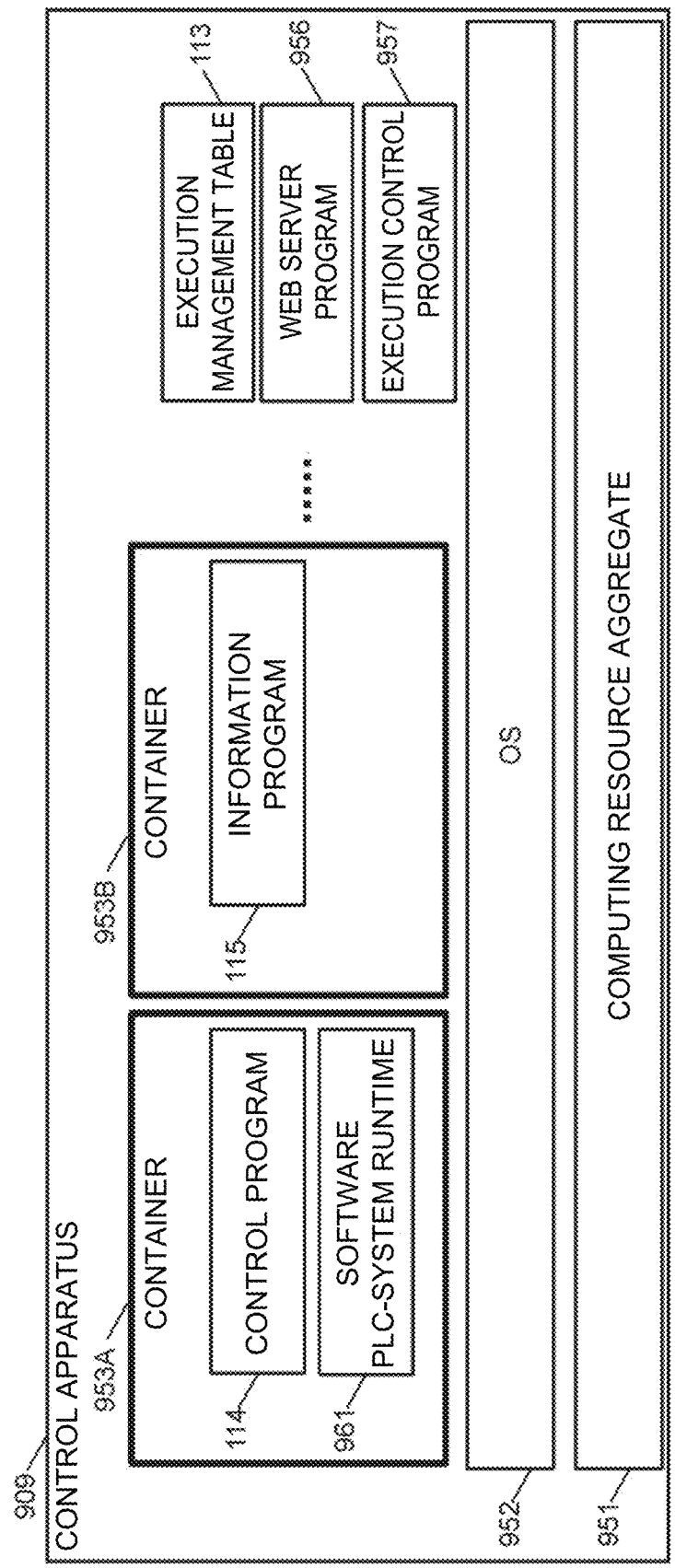

CONTROL APPARATUS

TECHNICAL FIELD

The present invention generally relates to a control apparatus.

BACKGROUND ART

Patent Literature 1 (Japanese Patent Laid-Open No. 2004-362327) discloses "a distributed monitoring control system in which a monitoring personal computer in a monitoring control facility of a plant is coupled to a control programmable logic controller via a network and which is characterized in that a monitoring general-purpose personal computer is provided with an information management file of a control general-purpose programmable logic controller and the control general-purpose programmable logic controller is provided with an information automatic sweep tool of the control general-purpose programmable logic controller, thereby information input into the general-purpose personal computer and process information on the control general-purpose programmable logic controller are integrally managed using general-purpose software" (see claim 1).

Patent Literature 2 (Japanese Patent Laid-Open No. 2006-178818) discloses "a motion controller which includes a real-time OS, a memory, execution means for executing a ladder language program in synchronization with a motion control cycle, and a microprocessor on which the ladder language program and a C language program both operate, and which is characterized in that if the C language program loaded according to a project setting file of an engineering tool is a task-type project, the program is operated as a task of the real-time OS, and if the C language program is a function-type project, the program is stored in the memory in a state allowing another task to call as a function" (see claim 1).

CITATION LIST

Patent Literature

[Patent Literature 1]
Japanese Patent Laid-Open No. 2004-362327
[Patent Literature 2]
Japanese Patent Laid-Open No. 2006-178818

SUMMARY OF INVENTION

Technical Problem

Patent Literature 1 states that "however, in a conventional distributed monitoring control system 41, operator stations 50a-50n, digital control apparatuses 60a-60n, transmission paths 52a-52n, a trunk transmission path 42, transmission paths 61a-61n, and the like are dedicated appliances for each of distributed monitoring control system manufacturers, are expensive and poor in scalability due to being incompatible with products from other manufacturers, and have not used general-purpose appliances even though some general-purpose appliances have capabilities that outperform dedicated appliances along with recent improvement in the performance of general-purpose appliances such as personal computers" (see Paragraph 0004).

A dedicated appliance for each of distributed monitoring control system manufacturers is a programmable logic controller, and the background of adopting such an apparatus configuration is that the programmable logic controller controls I/O units or the like and is coupled to apparatuses used for production, transport, or the like in a factory, and if delay occurs in control, operation of apparatuses and the like in the factory may become unstable or unexpected operation may occur. Therefore, conventional programmable logic controllers are designed not to perform complicated processing. The invention disclosed in Patent Literature 1 discloses that complicated processing is made not to be performed in the same manner, and a monitoring general-purpose personal computer is provided with an information management file of a control general-purpose programmable logic controller so that the control of the programmable logic controller will not be affected.

Consequently, performing information processing in the programmable logic controller is not considered in Patent Literature 1.

The section of technical problem in Patent Literature 2 states that "there was a problem in which since a ladder language application program and a C language application program operate on different microprocessors, the ladder language application cannot call the C language application program as a function."

That is, Patent Literature 2 aims at enabling the ladder language application program to call the C language application program as a function on the same microprocessor.

Patent Literature 2 describes the invention of a system that is composed of a motion controller and an engineering tool, wherein a ladder language task and a C language task coexist and operate in the motion controller, and the engineering tool downloads a C language program and a setting file to the motion controller.

Patent Literature 2 also states that a ladder language task and a C language task coexist in the motion controller, and the ladder language task and a task of a C language program operate on a real-time OS (Operating System).

If the C language program is a task-type project, it operates as a task of the real-time OS, and if the C language program is a function-type project, it is stored in a memory of the motion controller in the state of being callable as a function from another task.

That is, in the case of being the function-type project, another task, for example, a ladder language task inputs the project name of the function-type project as an argument to execute a function block for calling a C language function.

That is, the ladder language task callas the C language function-type project and numerically controls a machine tool or the like coupled to the motion controller.

The C language task inputs the project name of the task-type project and a type of operation such as wakeup or suspension of the task as arguments to call a task operation API. It is stated that the task operation API handles the project name as a task name and calls a function provided by the real-time OS corresponding to a type of task operation to indirectly achieve task operation of another task-type project.

Regarding a C language program loaded as a task-type project, it is stated that execution control of the C language program loaded as the task-type project is possible at execution timing of a ladder language program.

That is, it is considered that the C language program loaded as the task-type project can be used for the use to perform operation synchronized with motion control and the use to take time for processing like advanced numerical calculation.

That is, it is used to perform execution control of the C language program loaded as the task-type project at execution timing of the ladder language program for controlling the machine tool or the like coupled to the motion controller.

Therefore, whether it is a function type or a task type, part of the ladder language is written as C language or execution control of the C language program is performed at the execution timing of the ladder language program. That is, regarding the C language program described in Patent Literature 2, a technical idea used for controlling the machine tool or the like coupled to the motion controller is disclosed.

Therefore, in Patent Literature 2, it is not considered to use the C language program for purposes other than controlling hardware such as the machine tool coupled to the apparatus.

The present invention has been made in consideration of the above points, and an object is to provide a technique capable of flexibly changing a program installed in a control apparatus.

Solution to Problem

In order to solve the problem, one example of the present invention is that a control apparatus includes a storage unit that is a base of one or more shared areas, and a processor unit that executes a plurality of programs. The plurality of programs include one or more information programs in addition to one or more control programs. Each of the one or more shared areas is a storage area that at least one control program among the one or more control programs, and at least one information program among the at least one or more information programs can access, and is a storage area that stores shared information including at least one of information related to an I/O port accessed by the relevant control program, and information related to the relevant control program.

Each of the one of more control programs is a program that performs scan operation of outputting control information on the relevant control object apparatus coupled to the I/O port accessed for controlling a control object apparatus with respect to the control program, to this I/O port.

On the other hand, each of the one or more information programs is a program that performs information processing that does not include scan operation.

Advantageous Effect of Invention

According to the present invention, it is possible to flexibly change a program installed in a control apparatus.

BRIEF DESCRIPTION OF DRAWINGS

FIG. 3 is a diagram showing a table configuration example of an execution management table.

FIG. 6A is a diagram showing a table configuration example of the execution management table.

FIG. 6B is a diagram showing a table configuration example of the execution management table.

FIG. 7 is a diagram showing a table configuration example of a setting range table.

FIG. 8A schematically shows a first example of a resource boundary and its change.

FIG. 8B schematically shows a second example of a resource boundary and its change.

FIG. 8C schematically shows a third example of a resource boundary and its change.

FIG. 9 shows another example of a platform where a control program and an information program coexist.

DESCRIPTION OF EMBODIMENTS

Figure 1:
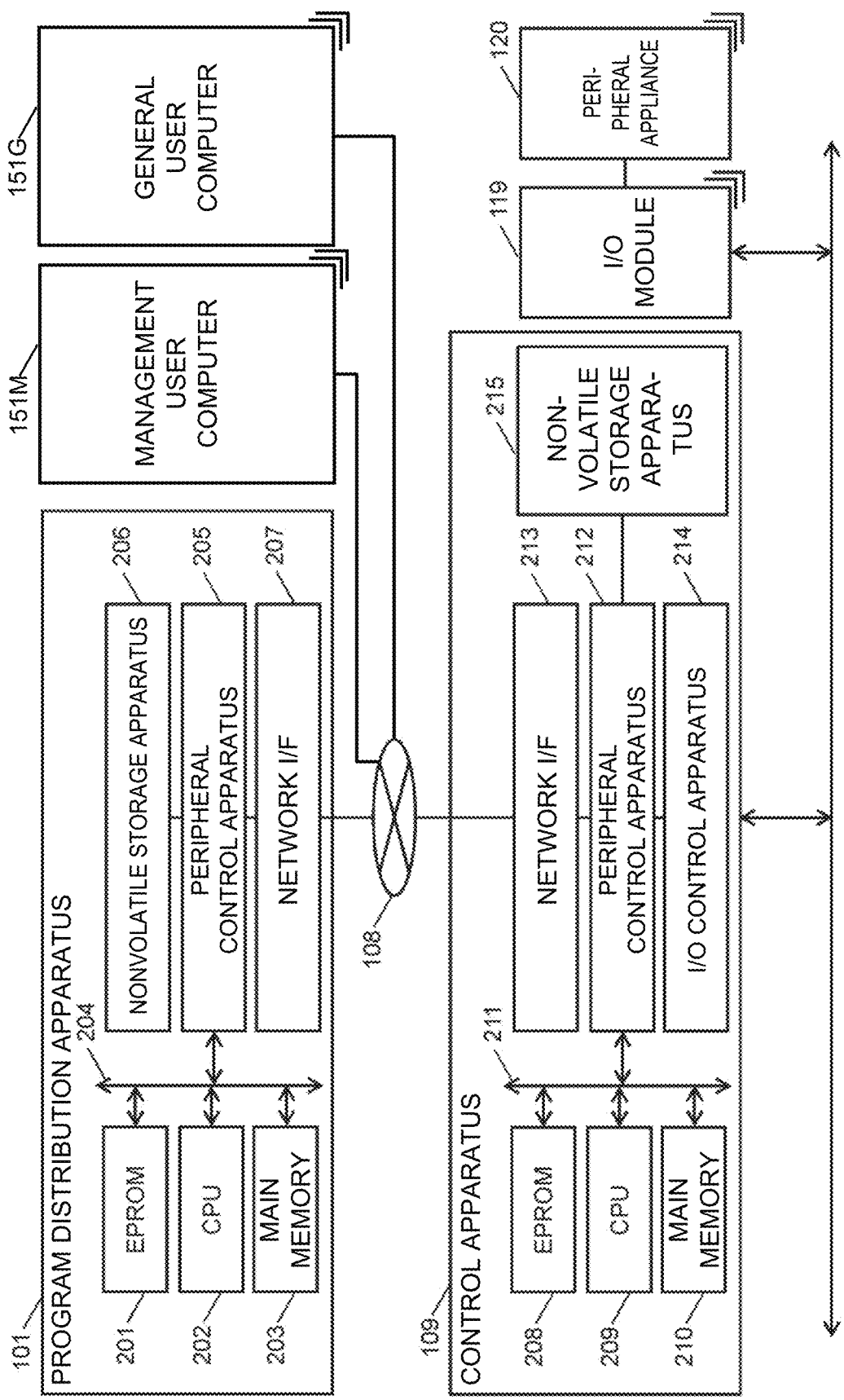
FIG. 1 is a block diagram showing a hardware configuration example of a system including a control apparatus according to a first embodiment.

Hereinafter, embodiments of the present invention will be described with the reference to the drawings.

Description of the same or similar parts is not repeated as a general rule other than when especially needed. Even if reference signs described in a predetermined figure are explained in another figure, description of the same or similar parts is omitted.

In the following embodiments, when it is necessary for the sake of convenience, each embodiment will be described by dividing it into a plurality of sections or embodiments, but they are not independent of each other unless otherwise specified, and have relation such as one being a variation, detail, or supplementary explanation of part or all of another.

In the following embodiments, when referring to a number or the like of elements (including the number, numerical value, quantity, range, or the like), excluding the cases such as being especially specified and being limited to a specific number clearly from a principle, it is not limited to the specific number, and may be the specific number or more or the specific number or less.

In the following embodiments, an "interface unit" includes one or more interfaces. The one or more interfaces may be the same type of one or more interface apparatuses or may be two or more different types of interface apparatuses.

In the following embodiments, a "storage unit" includes one or more memories. At least one memory regarding the storage unit may be a volatile memory. The storage unit is mainly used at the time of processing by a processor unit. The storage unit may include one or more nonvolatile storage apparatuses (for example, an HDD (Hard Disk Drive) or an SSD (Solid State Drive)) in addition to the memories.

In the following embodiments, a "processor unit" includes one or more processors. At least one processor is typically a microprocessor like a CPU (Central Processing Unit) but may be another type of processor like a GPU (Graphics Processing Unit). Each of the one or more processors may be a single core or may be a multicore. The processors may include a hardware circuit that performs part or all of processing.

In the following embodiments, there are cases where functions are described by expression of a "kkk unit" (excluding the interface unit, the storage unit, and the processor unit), the functions may be implemented by one or more computer programs (excluding a control program and an information program described later) being executed by the processor unit or may be implemented by one or more hardware circuits (for example, an FPGA (Field-Programmable Gate Array) or an ASIC (Application Specific Integrated Circuit)). When the functions are implemented by the programs being executed by the processor unit, since predetermined processing is performed using the storage unit, the interface unit, and/or the like as appropriate, the functions may be regarded as at least part of the processor unit. Processing described by using the functions as a subject may be made processing which the processor unit or an apparatus including the processor unit performs. The programs may be installed from a program source. The program source may be, for example, a program distribution computer or a computer-readable storage medium (for example, a non-temporal recording medium). Description of each function is an example, and a plurality of functions may be integrated into one function or one function may be divided into a plurality of functions.

In the following description, information that produces an output for an input may be described by expression of an "xxx table," the information may be data of any structure and may be a learning model like a neural network that generates an output for an input. Therefore, the "xxx table" can be called "xxx information." In addition, in the following description, the configuration of each table is an example, and one table may be divided into two or more tables or all or part of two or more tables may be one table.

In the following embodiments, it goes without saying that their components (also including element steps and the like) are not necessarily essential unless they are otherwise specified or they are considered obviously essential in principle.

The control apparatus is also referred to as a sequence control apparatus, a motion control apparatus, or a programmable logic controller (PLC). In the control apparatus, a program that is written in a programming language specific to control apparatuses such as ladder logic (LD language), sequential function chart (SFC language), function block (FBD language), structured text (ST language), and instruction list (IL language) or a general-purpose programming language used in the information communication field like C language and performs control processing represented by sequence control or motion control is referred to as a "control program." The control program needs to actually operate peripheral appliances including a motor and the like via an I/O module or the like, and to cause a production system or the like to operate appropriately. Therefore, the control program is required to reliably perform a process within a set time (real-time property).

The control program controls a control object apparatus (for example, a hardware module like an apparatus component, an apparatus including one or more hardware modules, or a system including a plurality of apparatuses) by a command describing control contents. For example, in control of "actually operating peripheral appliances including a motor and the like via an I/O module or the like and causing a production system to operate appropriately," the "production system" or "at least one apparatus included in the production system" is a "control object apparatus." The control object apparatus is typically an apparatus coupled via an I/O control apparatus (an example of the interface unit) in the control apparatus. The control object apparatus may be directly controlled from the control program (for example, without going through an I/O module or a peripheral appliance coupled to the control apparatus) or may be indirectly controlled from the control program (for example, via the I/O module or the peripheral appliance coupled to the control apparatus).

Since a language that controls the control object apparatus is not limited to a programing language specific to control such as the ladder language, and may be written in a general-purpose programing language such as C language, a program that controls the control object apparatus (typically hardware) is referred to as a "control program."

A control program written in the ladder language or the like performs "scan operation" that reads or writes (acquires or updates) the state of a control object apparatus designated in a description in the ladder language or the like.

The scan operation needs to be performed at a predetermined interval, and the predetermined interval is referred to as a "scan time". The scan time relates to a computation time of the control program and is also referred to as "cycle time" in some cases, because a computation period related to control or operation related to control are performed repetitively at a predetermined interval.

Since the control object apparatus coupled to the control apparatus is coupled to, for example, an apparatus used for production, transport, or the like in a factory, when scanning is delayed, operation of the apparatus or the like in the factory may become unstable or unexpected operation may occur. The scan operation needs to be performed within a predetermined scan time.

The scan time becomes longer as the number and types of control object apparatuses controlled by the control apparatus increase. Accordingly, it is important to apply the scan operation to the control object apparatuses within the scan time.

An I/O (Input/Output) port is built in or coupled to the control apparatus. The I/O port may be included in an I/O module, an I/O unit, or the like. Hereinafter, the I/O port itself or an apparatus (I/O module, I/O unit, or the like) including the I/O port may be collectively referred to as the "I/O port."

The I/O port is coupled to the control object apparatus, for example, a belt conveyer, a limit switch, and an actuator (for example, a motor) in a production facility, and is used for control related to operation of the control object apparatus. The I/O port is a digital or analog I/O port. For example, the analog I/O port is used for reading and writing information such as the voltage, current, or temperature the control object apparatus of the control apparatus.

Regarding an inverter unit or a CNC (Computerized Numerical Control) that receives control information transmitted from the I/O port of the control apparatus on the basis of the control program by cable or radio, since an inverter or the CNC itself performs motion control of an actuator, the real-time property is required.

Control of the control object apparatus means controlling the operation of the I/O port coupled to the control object apparatus. That is, the control program is a program that controls the I/O port coupled to the control object apparatus; in other words, it is a program that outputs control information on the control object apparatus to the I/O port coupled to the control object apparatus (specifically, for example, performs scan operation including output of the control information).

In such a control apparatus, it is considered performing information processing (for example, complicated arithmetic computation or information communication processing like transmitting and receiving information to/from a SCADA, a MES, or a cloud system) in addition to the control of the control object apparatus. It may be difficult to program such information processing in the language specific to control described above, and such information processing may be written using a programming language used in the information processing field such as C language or Java® language. A program that performs such information processing is referred to as an "information program."

One example of the difference between the control program and the information program will be described.

As described above, the control program is a program related to control of the I/O port of the control apparatus whereas the information program is a program that performs information processing (for example, arithmetic computation or communication with the cloud as described above).

The control program is written in the ladder or ST language or the like, and has a higher real-time property than a program written in a general-purpose language represented by Java®, python, or the like. The information program is written in the language represented by Java®, python, or the like, and is more suitable for information processing than a program written in the ladder or the like.

Languages, such as C language, that have a high real-time property, are also suitable for control of hardware, and are also suitable for information processing may be usable for both control program and information program.

The information program is a program other than the control program described before (however, excluding one or more programs for implementing, for example, a task management unit 110, a control program execution unit 111, an information program execution unit 112, and an I/O control unit 117 described later). Although the control object apparatus is coupled to the control apparatus via the I/O port, the information program is a program that does not access the analog or digital I/O port (however, excluding an I/O port that is permitted to be shared with the information program) coupled to the control object apparatus. To put it another way, the control program is a program that performs scan operation including transmitting the control information on the control object apparatus to the analog or digital I/O port coupled to the control object apparatus. On the other hand, the information program is a program that performs information processing not including scan operation (different from scan operation) (that is, a program that does not perform scan operation).

A control apparatus with a control program and an information program installed according to the following embodiments is to implement a program change such as addition, deletion, update (rewrite), or replacement of an information program, without stopping the control program or without delaying scan operation of the control program or causing the control program to perform unexpected operation, even when executing the information program in addition to the control program.

First Embodiment

A first embodiment will be described with reference to FIG. 1 or the like.

FIG. 1 is a block diagram showing a hardware configuration example of a system including a control apparatus according to the first embodiment.

A program distribution apparatus 101, a control apparatus 109, one or more management user computers 151M, and one or more general user computers 151G are coupled to an information network 108. In addition, the control apparatus 109 and one or more I/O modules 119 (an example of an I/O port) are coupled to a control network 118. The information network 108 is a communication network used when an information program performs information communication processing (that is, communication processing different from transmission of control information). The control network 118 is a communication network used when a control program performs control information transmission. The information network 108 and the control network 118 may be different types of networks or may be the same type of networks (for example, both are a LAN (Local Area Network)). In addition, at least part of the information network 108 and at least part of the control network 118 may be integrated.

The management user computers 151M are computers operated by at least management users. The general user computers 151G are computers operated by at least general users. All the computers function as input/output consoles for at least one of the program distribution apparatus 101 and the control apparatus 109. Specifically, for example, all the computers each include an input device like a keyboard and a pointing device, and an output device like a display device. The "management users" are users who write a control program (for example, engineers who have a deep knowledge of a control object such as an automated machine or a production facility), whereas the "general users" are users who write an information program (for example, general system engineers who do not have a deep knowledge of a control object). The control apparatus 109 may receive description (including setting of a parameter group) of at least one of a control program and an information program from at least one of the management user computers 151M and the general user computers 151G, or instead of or in addition to the control apparatus 109, the program distribution apparatus 101 may receive the description. Hereinafter the management users and the general users may be collectively referred to as "users." A user may be a different type of user such as a system manager (for example, a manager of a control system which is a system composed of the program distribution apparatus 101 and the control apparatus 109) instead of any of a management user and a general user.

One or more peripheral appliances 120 are coupled to the one or more I/O modules 119. Each of the peripheral appliances 120 is at least one appliance such as a sensor and a drive. The I/O modules 119 function as bus slots to which the peripheral appliances 120 are detachably attached according to need. Control object apparatuses are coupled to the I/O modules 119 via or without the peripheral appliances 120. The ratio of the control object apparatuses to the I/O modules 119 may be any of 1:1, 1: many, many: 1, and many: many. Some of the I/O modules 119 may be coupled to the information network 108 in addition to the control network 118, that is, the some of the I/O modules 119 may be devices shared by the control program and the information program.

The program distribution apparatus 101 manages the control program and the information program. The program distribution apparatus 101 includes an EPROM 201, a CPU 202, a main memory 203, a peripheral control apparatus 205, a nonvolatile storage apparatus 206, and a network interface (corresponding to a network I/F shown) 207. The program distribution apparatus 101 is coupled to the information network 108 via a network interface 207.

The program distribution apparatus 101 provides the control program or provides the information program to the control apparatus 109 via the information network 108 by control of the peripheral control apparatus 205. The program distribution apparatus 101 provides according to a request the control program and the information program stored in advance in the nonvolatile storage apparatus 206 by control of the CPU 202.

The peripheral control apparatus 205 is coupled to the EPROM 201, the CPU 202, and the main memory 203 via a bus 204. The CPU 202 reads and executes a management program stored in advance in the EPROM 201 onto the main memory 203, and manages the control program and the information program by the management program.

The management program sequentially provides at least one program of the control program and the information program in response to a request. Execution of the management program by the CPU 202 implements a program distribution unit 102 and an execution management data generation unit 103 described later.

On the other hand, the control apparatus 109 includes an EPROM 208, a CPU 209, a main memory 210, a peripheral control apparatus 212, an I/O control apparatus 214, a nonvolatile storage apparatus 215, and a network interface (corresponding to a network I/F shown) 213. The I/O control apparatus 214 and the network I/F 213 are examples of an interface unit. The EPROM 208, the main memory 210, and the nonvolatile storage apparatus 215 are examples of a storage unit. The CPU 209 and the peripheral control apparatus 212 are examples of a processor unit. In the control apparatus 109, the control program and the information program provided from the program distribution apparatus 101 operate while coexisting on the same platform.

The peripheral control apparatus 212 is coupled to the network I/F 213, the I/O control apparatus 214, the nonvolatile storage apparatus 215, and a bus 211. The EPROM 208, the CPU 209, and the main memory 210 are also coupled to the bus 211.

The EPROM 208 has stored the control program and the information program prepared in the control apparatus 109 in advance in an initial state. The CPU 209 includes a plurality of cores and can independently operate each core.

The control program and the information program installed in the control apparatus 109 are not limited to one for each, and by setting resources available to the control apparatus 109 for each program, a plurality of control programs and/or a plurality of information programs can be installed.

The CPU 209 reads and executes the control program and the information program stored in advance in the EPROM 208 onto the main memory 210, and controls operation of the control program and the information program.

That is, when the control program and the information program are read and executed, they become a control program 114 and an information program 115 in FIG. 2 described later.

The control program 114 and the information program 115 have different roles from each other.

The control program 114 accesses the I/O module 119 of the control apparatus 109 and controls the control object apparatus. In addition, the control program 114 may compute on the basis of a read result and access the I/O control apparatus 214 on the basis of the computation result for control of the control object apparatus. The control program 114 may access the network I/F 213 coupled to the control object apparatus for control of the control object apparatus. That is, instead of or in addition to the I/O module 119, at least one of the I/O control apparatus 214 and the network I/F 213 may be an example of the "I/O port." That is, the control program 114 accesses the I/O port coupled to the control object apparatus for control of the control object apparatus (for transmission of control information on the control object apparatus), in other words, transmits a command to control the I/O port.

On the other hand, the information program 115 obtains information on the I/O control apparatus 214 and the like, computes, and transmits computation results to another apparatus or facility coupled to the control apparatus 109 via the network I/F 213. The "other apparatus or facility" referred to in this paragraph is an apparatus or a facility that is coupled to the control apparatus 109 but different from the control object apparatus of the control program 114.

The control apparatus 109 can have a shared area (not shown) where both control program 114 and information program 115 can access. The shared area may be secured in the main memory 210 and the nonvolatile storage apparatus 215. For example, the shared area may be a logical storage area such as a shared directory or may be a physical storage area designated by a physical address (for example, a memory address). For example, the control program 114 generates a task that reads or writes a value of data that may be shown to the information program 115 from/into the shared area, and when the task is executed, the value of data in the shared area may become accessible from the information program. The "value of data that may be shown" means shared information which is information shared with one or more information programs 115 in the broad sense. The shared information includes, for example, port information indicating the state of the I/O port (or including another type of information on the I/O port) or control program information related to internal variables or the like of the control program. For example, the shared area may be provided by a task management unit 110 described later or may be provided by at least one of the control program 114 and the information program 115 that access the same shared area.

As described above, since the information program 115 can be prevented from directly accessing the I/O port coupled to the control object apparatus of the control program 114, safety is improved. In other words, instead of directly accessing the I/O port coupled to the control object apparatus of the control program 114, the information program 115 refers to the shared information in the shared area, and thereby can learn the state of the I/O port or the state of the control program 114.

The information program 115 may receive information from a facility or an apparatus that is coupled via the network I/F 213 but not a control object apparatus of the control program 114. The information program 115 can compute the received information or the like and communicate with another apparatus or facility via the network I/F 213.

The CPU 209 controls the peripheral control apparatus 212 to control download of the control program and the information program from the program distribution apparatus 101 via the network I/F 213.

The CPU 209 controls the peripheral control apparatus 212 to control the plurality of peripheral appliances 120 via the I/O control apparatus 214 and the plurality of I/O modules 119. The peripheral appliances 120 are associated with the I/O modules 119 on a one-on-one basis, and the CPU manages, for example, digital I/O registers associated with I/O modules on a one-on-one basis, and can operate the I/O modules 119 one by one by operation of the registers.

Figure 2:
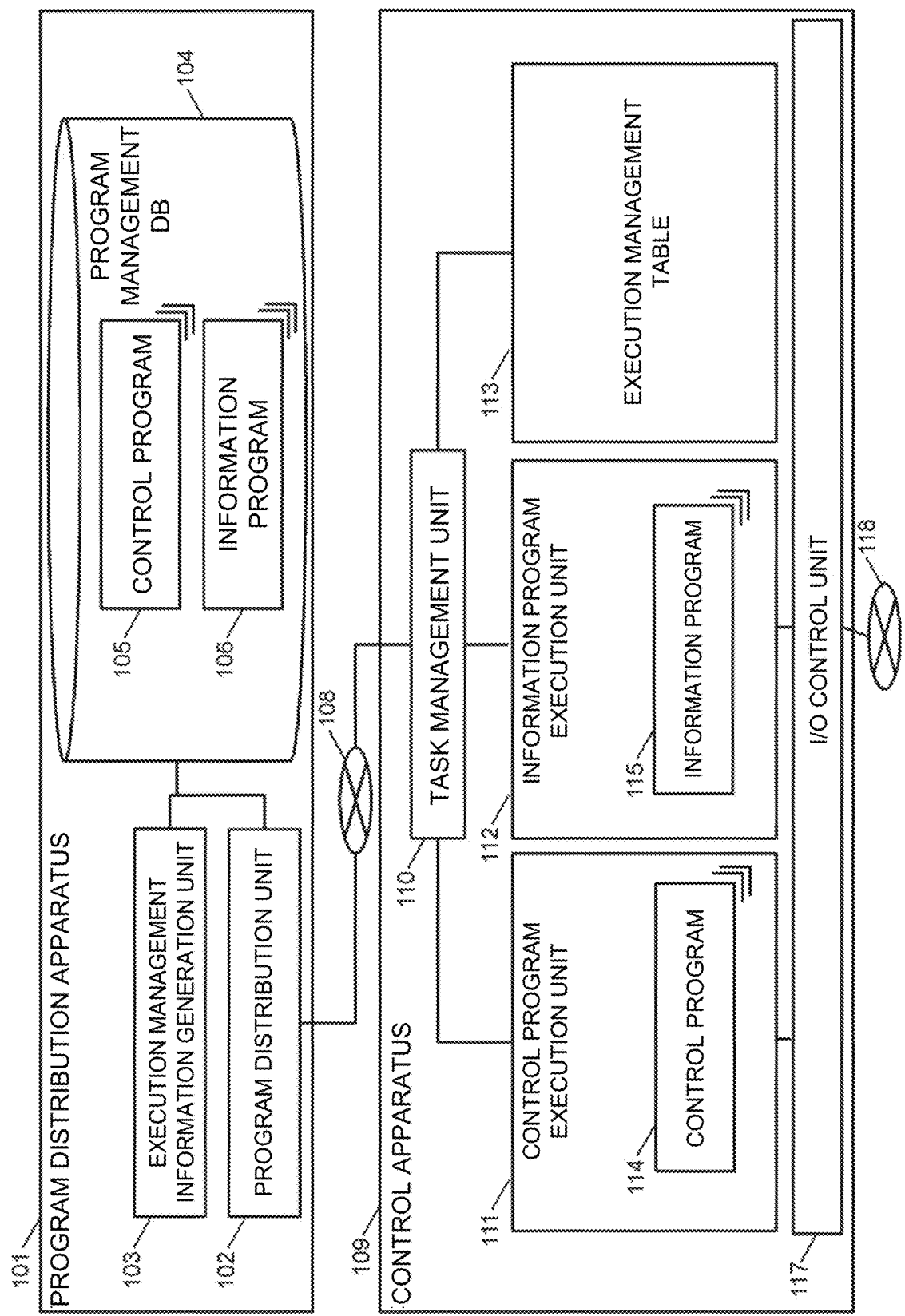
FIG. 2 is a block diagram showing a functional schematic configuration of a system including a control apparatus according to the first embodiment.

FIG. 2 is a block diagram showing a functional schematic configuration example of a system including the control apparatus according to the first embodiment.

The program distribution apparatus 101 includes a program management database (corresponding to a program management DB shown) 104, a program distribution unit 102, and the execution management generation unit 103. The program management DB 104 is based on at least part of the main memory 203 and the nonvolatile storage apparatus 206. The program distribution unit 102 and the execution management generation unit 103 are implemented by the already-described management program being executed by the CPU 202.

The program management database 104 manages a control program 105 and an information program 106. The execution management generation unit 103 generates execution management data representing parameters when at least one program of the control program 105 and the information program 106 is executed at the control apparatus 109. The execution management data is one or more parameters like, for example, the priority of each task of the control program 105 and the information program 106 and an upper limit storage capacity available to each of the control program 105 and the information program 106.

The program distribution unit 102 also provides the execution management data indicating parameter values corresponding to the at least one program when providing the at least one program on request.

The control apparatus 109 may also be referred to as a sequence control apparatus, a motion control apparatus, or a programmable logic controller (PLC). Control contents are written in a control specific programming language such as ladder logic (LD language), sequential function chart (SFC language), function block (FBD language), structured text (ST language), and instruction list (IL language). In some cases, part or all of description by the ladder language or the like may be replaced with description by a general-purpose programming language such as C language.

It is effective to use the control specific programing language represented by the ladder language for the control program 105 (114) that controls the control object coupled to such a control apparatus 109. The control specific programing language can display a ladder and is effective to monitor the state of the control object or the like.

On the other hand, the information program 106 (115) is effective for information processing (for example, complicated arithmetic computation or information communication processing like transmitting and receiving information to/from a SCADA, a MES, or a cloud system) in such a control apparatus 109.

Such information processing may be difficult to program in the control specific language, and the information processing may be written in a programming language used in the information communication field such as so-called C language or Java® language.

The program management database 104 manages the control program 105 with function to execute the above-described control contents and the information program 106 with function to execute the above-described information processing.

The control apparatus 109 includes the task management unit 110, a control program execution unit 111, an information program execution unit 112, an execution management table 113, and an I/O control unit 117.

The control program execution unit 111 is, for example, a runtime library, and operates together with the control program 114 in response to a call from the control program 114. The information program execution unit 112 is, for example, a so-called library, and operates together with the information program 115 in response to a call from the information program 115.

The control program 114 corresponds to the control program 105 (or one or more tasks generated by execution of the control program 105) already distributed from the program distribution apparatus 101 to the control apparatus 109, and the information program 115 corresponds to the information program 106 (or one or more tasks generated by execution of the information program 106) already distributed from the program distribution apparatus 101 to the control apparatus 109.

The execution management table 113 stores the execution management data received together with the at least one program provided from the program distribution apparatus 101.

On the other hand, the task management unit 110 mainly has two functions, specifically, a program reception function and a program execution management function. The program reception function is a function to receive the at least one program provided from the program distribution apparatus 101 on request. On the other hand, the program execution management function is a function to control execution of the at least one program on the basis of the execution management data stored in the execution management table 113 when executing the at least one program.

The I/O control unit 117 transfers control information from the control program 114 to the transmission destination of the control information.

As described above, the control apparatus 109 includes the main memory 210 having a storage area of a predetermined storage capacity used by each task of the control program 114 and the information program 115.

In the program distribution apparatus 101, the execution management generation unit 103 generates, as execution management data, at least execution management data indicating parameter values of at least one of the priority of each task of the control program 105 and the information program 106 and an upper limit storage capacity of the main memory 210 available to each task of the control program 105 and the information program 106.

FIG. 3 shows a table configuration example of the execution management table 113 shown in FIG. 2.

The execution management table 113 has entries for each of the control program 114 and the information program 115. Each of the entries has, for example, a program name 301, a program type 302, a task priority 303, an execution cycle 304, a memory upper limit 305, a CPU core number 306, a use device 307, and an exclusive device 308. Hereinafter, one program is exemplified ("object program" in the description with reference to FIG. 3).

The program name 301 represents the name of the object program. The program type 302 represents a program type indicating whether the object program is the control program 114 or the information program 115. Note that it is possible to identify whether each program is the control program 114 or the information program 115 from the first three characters of the program name 301. "CTL" represents the control program 114 and "ICT" represents the information program 115. Each of the control program 114 and the information program 115 may be represented below by a program name.

The task priority 303 represents the priority of a task corresponding to an object program. The task priority 303 allows the priority to be set, for example, from "0 (priority: high)" to "20 (priority: low)." That is, the smaller the value as the task priority 303, the higher the priority.

The execution cycle 304 represents a cycle when a routine process in an object program is executed. The "execution cycle" is a scan time. According to the example shown, the scan time of CTL001 is 10 msec and the scan time of CTL002 is 1 msec. Since scan operation is an operation specific to the control program 114 of the control program 114 and the information program 115, the execution cycle 304 is an effective value for the control program 114, but is an ineffective value for the information program 115. The execution cycle 304 (scan time) may be a value determined by simulation with an engineering tool, or a scan time determined by actually executing the control program 114 at the control apparatus 109.

The memory upper limit 305 represents an upper limit of a storage capacity that an object program can use in the storage area of the main memory 203.

The CPU core number 306 represents the number of a core allocated to an object program among a plurality of cores mounted on the CPU 209 of the control apparatus 109.

The use device 307 represents a use device which is a device the object program can use, specifically, an I/O module 119 (an available peripheral appliance 120 coupled to the I/O module 119) which the object program can use.

An exclusive device 308 represents an exclusive device which is a device exclusively used by the object program (that is, an I/O module 119 which the object program cannot share with another control program 114 or information program 115) among one or more use devices (I/O modules 119) represented by the use device 307 corresponding to the object program.

According to the example shown, for example, the following can be said.

CTL001 is a control program. CTL001 is, for example, as follows. That is, the task priority is set lower than that of CTL002. The memory upper limit is 16 MB and the number of a CPU core used is 0. The use devices are DI1 and DO1 (a digital input 1 and a digital output 1 of the control apparatus).

DI1 and DO1 are set such that CTL001 exclusively uses them so that other programs do not use. In the control apparatus, since an exclusive device (device set as the exclusive device 308) is not shared among a plurality of programs, control related to the exclusive device (here, DI1 and DO1) can be prevented from becoming unstable.

CTL002 is a control program whose use devices are eth1, eth2, and serial1, specifically, a control program that uses two Ethernet® ports and one RS-232C port. In addition, since CTL002 has a higher real-time property than CTL001, CTL002 has a higher task priority than CTL001.

CTL002 is indicated about the case where eth2 is, for example, a device used for motion control. As the motion control has a high real-time property and is prioritized over other processing, the highest priority is set among four programs.

Since the number of a CPU core used by CTL002 is 1, and the number of a CPU core used by CTL001, ICT001, and ICT006 is 0, CTL002 exclusively uses the CPU core with the number of 1.

It is understood that CTL002 has a high priority from not only a viewpoint of the priority specified in the task priority 303 but also a viewpoint of exclusively using the core with the number of 1 among the plurality of cores included in the CPU 209. By performing such setting, CTL002 can be made to have a higher priority among the control programs.

Next, the memory upper limit 305 will be described.

If the memory upper limit is not set, each program can reserve and use a memory without limit when actually computing. For example, if the upper limit of the memory available for the information program is not set, the information program may reserve an area that may be possibly used by the control program but has not been reserved yet. However, for example, if a program that uses a huge amount of memory is added, the memory of the entire system may be used up due to the addition of the program. In such a case, the control apparatus or an OS may go down and operation of the control program may be stopped, or processing of the control program is hindered by activation of a forcible memory release function by the OS and scan operation cannot be completed within the scan time.

The embodiment can prevent the control apparatus or the like from going down by making the total value of the memory upper limit 305 equal to or smaller than a value available to the entire system of the control device.

The value available to the entire system is desirable to be a value excluding a part used by the OS and the like from the memory mounted on the control apparatus. This is for preventing the processing of the control or information program from affecting an area of the OS and the like.

By setting the value of the memory upper limit 305 for each program, if a program has a trouble of using memory more than assumed, it is possible to stop only the program and prevent an impact on other programs.

Next, the task priority 303 will be described.

The task priority is priority when each program performs tasks. By setting the task priority for each program, it is possible to make a scheduler or the like of the OS recognize the priority of CPU allocation to programs.

When a plurality of programs are executed without explicitly setting the task priority, resource allocation like CPU allocation is performed according to a rule which the scheduler of the OS has in advance. For example, scheduling like the CPU being equally allocated to the plurality of programs is performed.

Such scheduling may affect the operation of the control program in the case of a program that is important to reliably finish processing within the scan time like the control program, by making impossible to finish processing within the scan time by operation of another program.

For example, when a processing start request of a second task with relatively higher task priority than a first program is issued by timer interruption or the like during processing execution (CPU allocation) of the first program, processing of the first program is interrupted and processing of the second program is started. Then, when the second program finishes CPU allocation by sleep or the like, the processing of the first program is resumed.

For example, when a processing start request of a third task with relatively lower task priority than a first program is issued by timer interruption or the like during processing execution (CPU allocation) of the first program, processing start of the third program is forced to wait until the first program finishes CPU allocation by sleep or the like.

Therefore, by setting the task priority 303, processing of a program with higher priority can be preferentially performed.

This allows a program about which the user has determined that importance is higher to be preferentially performed. Even when the information program is processed by the control apparatus and the information program performs complicated calculation, an impact on the control program can be prevented.

Although the scan time which is the execution cycle 304 is not set for ICT001 and ICT002, since the task priority of the information program is lower than that of the control program, processing of the information programs can be performed in a time (for example, an idle time) when the CPU core is not used for calculation of the control program. This makes it possible to process the information programs without affecting processing of the control program.

The use devices of ICT001 and ICT002 are eth1, and eth1 is not set as exclusive use. Therefore, the port of eth1 can be shared and used by ICT001 and ICT002.

When ICT001 and ICT006 intend to use eth1 at the same time, ICT001 with higher in the task priority 303 first uses eth1. When ICT001 finishes the use of eth1, ICT006 with high in the task priority 303 can use eth1. In this way, each program can perform processing according to its task priority.

Figure 4:
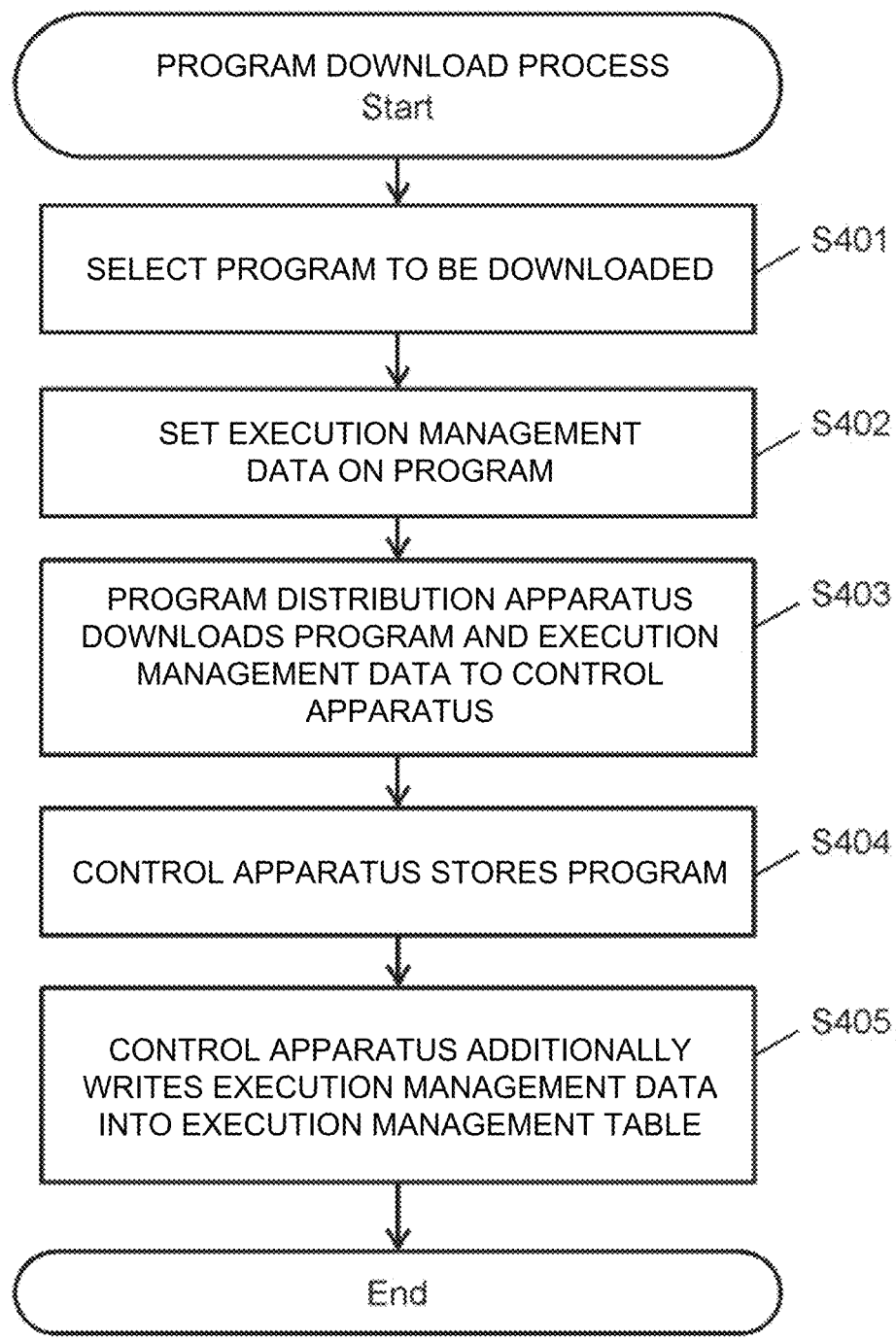
FIG. 4 is a flowchart showing one example of a program download process.

FIG. 4 is a flowchart showing one example of a program download process for the control apparatus 109 to download a desired program from the program distribution apparatus 101.

First in the program distribution apparatus 101, according to the user's operation using an operation screen not shown, a program to be downloaded is selected (step S401). In response to this, the program distribution unit 102 identifies a corresponding specific program on the program management database 104.

Next in the program distribution apparatus 101, execution management data for the specific program is set according to the user's operation on the operation screen (step S402). The execution management data includes, for example, the task priority 303 as shown in FIG. 3.

As a result, the execution management generation unit 103 can set, for example, at least one parameter of the priority when each task of each program is executed and the upper limit storage capacity within the main memory 210 available to each task, as a parameter relating to an operation aspect of the specific program according to the user's input contents.

As an example, mainly priority will be taken and described below. The processing up to this point represents the processing in the program distribution apparatus 101 and the processing hereafter represents the processing in the control apparatus 109.

The program distribution apparatus 101 downloads the specific program and the execution management data associated therewith to the control apparatus 109 in response to a request from the control apparatus 109 (step S403).

Next, in the control apparatus 109, the task management unit 110 receives the downloaded specific program (corresponding to the program reception function described already). On completing reception, the task management unit 110 stores the specific program as the control program 114 in the main memory 210 if the specific program is a control program (step S404).

Next, in the control apparatus 109, the task management unit 110 additionally writes the execution management data downloaded together with the specific program into the execution management table 113 (corresponding to the program execution management function described already) (step 405).

Figure 5:
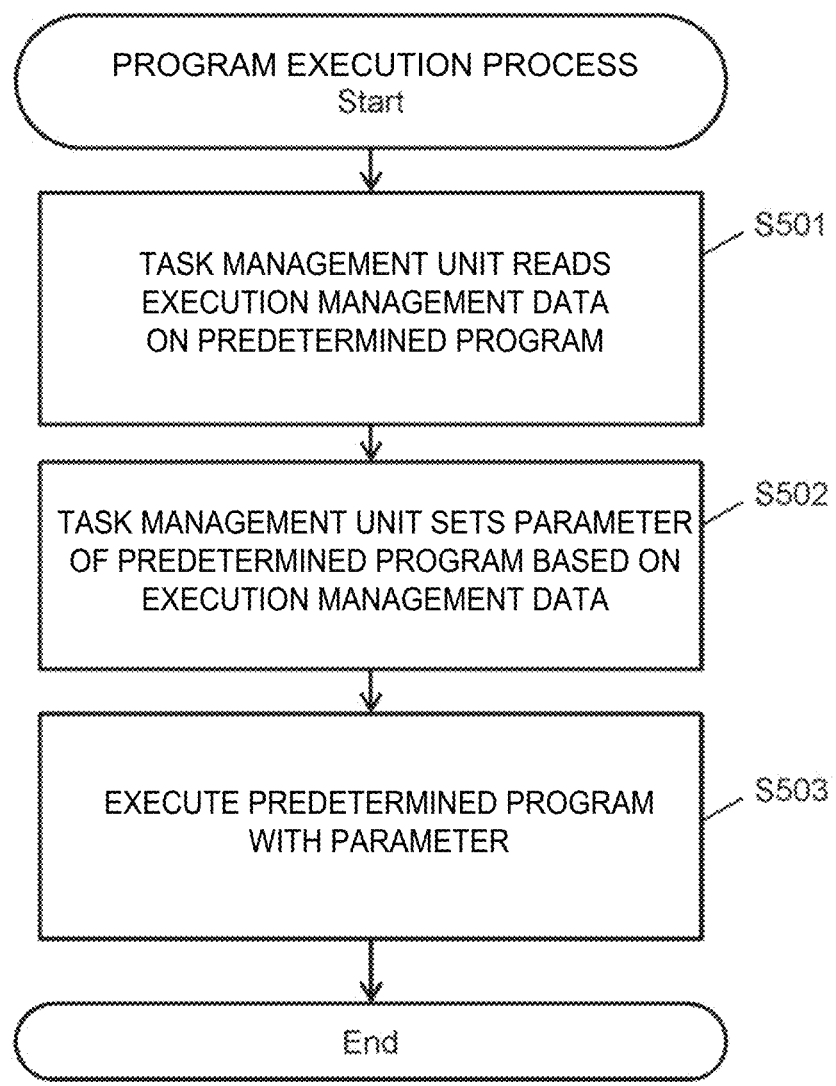
FIG. 5 is a flowchart showing one example of a flow of a program execution process.

FIG. 5 is a flowchart showing one example of a program execution process. The program execution process represents processing contents when the specific program is executed in the control apparatus 109.

The task management unit 110 reads execution management data corresponding to a predetermined program from the execution management table 113 when newly trying executing the predetermined program (step S501).

The execution management data corresponding to the predetermined program includes the priority when each task of the predetermined program managed in the priority 303 in the execution management table 113 is performed.

Next, as parameters of the predetermined program on the basis of the read execution management data, for example, the task management unit 110 sets the priority of each task of the predetermined program (at least one program of the control program 105 and the information program 106) and sets or determines the upper limit storage capacity of the main memory 210 available to each task (step 502).

The task management unit 110 sets such priority by using a predetermined command. On the other hand, the task management unit 110 sets the upper limit storage capacity.

According to the embodiment as above, the control program 114 and the information program 115 coexisting on the same platform (that is, the control apparatus 109) are made to operate according to the respective parameters on the platform. The task management unit 110 controls the control program execution unit 111 and the information program execution unit 112 on the basis of the parameter values such as the task priority of each of the programs 114 and 115 regarding the control program 114 and the information program 115, and thereby controls execution of each of the programs 114 and 115 (step S503).

In this case, ICT001 and ICT002, which are the information program 115, operate with predetermined resources. In addition, CTL001 and CTL002, which are the control program 114, operate with the predetermined resources at higher priority than ICT001 and ICT002.

By changing the execution management table 113 as appropriate, the control program 114 and the information program 115 can change part of the control program 114 or the information program 115 while other programs stay operating at the time of function change like, for example, addition, update, or deletion of a task.

The information program 115 can operate without requiring recompilation or re-download even when the execution management table 113 is changed if a predetermined resource is secured and there is no influence with other programs (a comparative example that requires recompilation or re-download will be described later).

Consequently, any functional change of addition, update, and deletion of each task of the control program 114 and the information program 115 is made to be easily performed, and so the control apparatus 109 enables flexible functional change.

Second Embodiment

A second embodiment will be described with reference to FIG. 3 and the like. The description will be focused on points different from the first embodiment and the description of points common to the first embodiment will be omitted or simplified.

In the second embodiment, the above-described operation screen (not shown) displays a remaining resource, for example, a remaining capacity of a main memory 210 available to each program, derived according to the upper limit storage capacity of the main memory 210 available to each program described above on the basis of the execution management table 113 shown in FIG. 3.

When, for example, the remaining resource and the like are selected according to predetermined operation on the operation screen, a program distribution apparatus 101 downloads execution management data indicating a parameter value including the remaining resource together with a selected program to a control apparatus 109.

In the control apparatus 109, a task management unit 110 receives the execution management data together with the selected program and registers the execution management data with an execution management table 113.

If the selected program is a control program 114, a control program execution unit 111 executes the control program 114, which is the selected program, using the remaining resource based on the execution management data as a parameter value.

On the other hand, if the selected program is an information program 115, an information program execution unit 112 executes the information program 115, which is the selected program, using the remaining resource based on the execution management data as a parameter value.

With the configuration as described above, similar effect to the first embodiment can be obtained, a user in contact with the remaining resource of the main memory 210 available to such each task can perform download setting on the basis of appropriate information, and the selected program can be prevented from affecting existing programs.

Some Variations

Next, variations will be described. In at least one of the first and second embodiments described above, at least one of the following variations can be adopted.

As a first variation, for example, a hypervisor or the like may be used to separate from an OS layer.

As a second variation, instead of sequentially performing processes of various programs, the order of processes may be changed or processes may be performed in parallel as long as processing results do not contradict each other.

As a third variation, there is an example shown in FIGS. 6A and 6B. That is, an information program is changed during operation of a control program.

Specifically, for example, as shown in FIG. 6A, the CPU core number 306 is common to CTL007 and ITL008. This indicates that the same core can be used for executing ITL008, an information program, during operation of CTL007, a control program, that is, processing of CTL007 can be affected by ITL008 although the task priority 303 and the use device 307 are different.

ITL008 is an information program and therefore is a program that can be changed during execution of a control program. After deleting ITL008 held by the control apparatus 109, ITL009 is transferred to the control apparatus 109. The transfer is performed by the program distribution apparatus 101 or the like. Thereby, ITL008 can be changed to ITL009.

Example of Above-Described Concept

Description of an example of the above-described concept is as follows. A control apparatus that controls operation of hardware by accessing an I/O port of control object apparatus hardware coupled physically (including being coupled not only directly but also indirectly through a network) includes storage means that reads information on the I/O port and stores the information in a shared area a control program and an information program can access, wherein: the control program obtains the information on the I/O port or the stored information on the I/O port, and outputs control information on an apparatus coupled to the I/O port to the I/O port; and the information program obtains the stored information on the I/O port, computes the obtained information on the I/O port, and thereby identifies processing information.

Summary and Example of More Specific Embodiment

The following description includes a summary of the above description and an example of a more specific embodiment. In other words, the following description may include any of parts overlapping with the above description and items not included in the above description.

Although it is conceivable that communication for obtaining information (for example, a measurement value by a sensor) necessary for controlling the control object apparatus will be made part of control by a control program (that is, communication is described in the control program), it is considered desirable to separate information processing like communication from control by the control program. One reason considered such that is that the control object apparatus of the control apparatus is generally an automated machine or a production facility like a machine tool, an automatic assembly apparatus, or an automatic transport apparatus, and requires high stability, that is, a real-time property.

Consequently, it is considered preparing an information program which is a program in which information processing like communication is described, in addition to the control program. Although it is conceivable to execute the information program with an apparatus different from the control apparatus in order to prioritize the control program for maintaining the real-time property, it is also conceivable to execute both control program and information program on the same platform like the control apparatus from a viewpoint of resource saving. In this case, it is required that the control program and the information program appropriately coexist in the control apparatus.

However, Patent Literatures 1 and 2 described above do not disclose or suggest a technique for appropriate coexistence of the control program and the information program from the reason described already.

A plurality of programs including one or more control programs 114 and one or more information programs 115 are executed on the same platform. "The same platform" is the control apparatus 109 according to the above description.

Each of the one or more control programs is a program that performs scan operation for controlling the control object apparatus for the control program. On the other hand, each of the one or more information programs is a program that performs information processing not including scan operation.

The information programs can be flexibly changed by at least one of the exemplified below.

For each of the plurality of programs 114 and 115, a plurality of parameter values that define a range of operation of the program are set. Execution of the control programs 114 and execution of the information programs 115 are performed on the basis of the plurality of parameter values for each of the control programs 114 and the information programs 115. The plurality of parameter values of each of the information programs 115 can be adjusted so that execution of any of the control programs 114 is not adversely affected.

One or more common areas are provided. The following can be said for each of the one or more common areas. That is, the common area is a storage area where at least one control program 114 of the one or more control programs 114 and at least one information program 115 of the one or more information programs 115 can access. In the storage area, for example, shared information including at least one of information on an I/O port accessed by the control program 114 and information (for example, internal variables) on the control program 114 is stored. An information program 115 capable of accessing the shared area can perform information processing on the basis of the shared information stored in the shared area. In other words, since the information program 115 is executed on the basis of the shared information based on execution results of the control program 114, the execution of the information program 115 is expected not to adversely affect the control program 114. Therefore, it can be expected that the information program 115 is changed without adversely affecting the control program 114.

For example, an execution management table 113 including the plurality of parameter values that define a range of operation of each of the plurality of programs 114 and 115 is prepared. Thereby, it is possible to prevent the execution (operation) of the information program 115 from adversely affecting the execution of the control program 114. For each of the plurality of programs 114 and 115, the plurality of parameter values include at least one of the following:

the task priority 303 (one example of the priority of the program);

the memory upper limit 305 (one example of one or more resource upper limits corresponding to one or more types of calculation resources); and the use device 307 and the exclusive device 308 (one example of an exclusive/shared device representing, among one or more I/O ports available to the program, which I/O port is an I/O port exclusive to the program and which I/O port is an I/O port that can be shared by two or more programs including the program).

There being a parameter value of program priority like the task priority 303 enables processing that prioritizes maintaining the real-time property required for the control program 114. For example, from a viewpoint of computing resource saving, it is conceivable that at least one computing resource such as a CPU core, a memory area, and an I/O port is set as a shared device, and, specifically, it is shared by the control program 114 and the information program 115. Setting of the task priority 303 enables execution of the information program 115 without impairing the real-time property of the control program 114 even if the control program 114 and the information program 115 share the computing resource.

There being a resource upper limit like the memory upper limit 305 also enables processing that prioritizes maintaining the real-time property required for the control program 114. For example, when the information program 115 stops after using an unlimited amount of memory, a memory amount release process will run, and it is considered that this process is preferentially performed over the control program 114. This is because it is considered that the control program 114 cannot perform appropriate processing unless the amount of memory is released. However, when this happens, the real-time property required of the control program 114 will be impaired. In order to avoid this, the resource upper limit is useful.

For each of the control program 114 and the information program 115, setting of an exclusive/shared device may be setting of combination of two or more parameter values. By setting an exclusive device, stable performance, for example, maintaining the real-time property can be expected. By setting a shared device, flexible processing can be expected while saving computing resources.

For example, a setting range table 700 exemplified in FIG. 7 may be prepared. A setting method different from the example described with reference to FIGS. 6A and 6B is indicted. CPU cores, memory upper limits, and LAN ports shown in FIGS. 8A and 8B show resources that correspond to the default value 703 and the setting value 704 in FIG. 7 and are available for the information program 115. That is, FIG. 8A shows a state where the control program 114 exclusively uses the CPU cores 1 to 4 but has not used the cores 3 to 4 yet, and the information program 115 exclusively uses the cores 5 to 8.

Each of the control program 114 and the information program 115 can use a memory of 128 MB at the maximum. Next, it is described that the control program 114 exclusively uses the LANs 1 and 2, the information program 115 exclusively uses the LAN4, and these programs share the LAN3. FIG. 8B shows resources corresponding to the values of the setting value 704 shown in FIG. 7. The setting range table 700 may be stored in the control apparatus 109 from a computer that the user uses (e.g., the management user computer 151M) via or without the program distribution apparatus 101. The setting range table 700 is a table that defines the range of the parameter values related to the information program 115, and stores information on the attribute 701, a settable range 702 and a default value 703 with respect to each of various parameter items (e.g., a plurality of parameter items including parameter items identical to at least one of the parameter items 303 to 308 as exemplified in FIG. 3). Hereinafter, one parameter item is exemplified ("object parameter item" in the description with reference to FIG. 7). The setting value 704 is a value set when the default value 703 is not used. When a part of the setting value 704 is input or set, values of the default value 703 may be used for the value having not been input or set. This allows the information program 115 to be executed even without setting all or some of the items when the user uses the information program 115. As shown in FIG. 7, the items may be displayed on display means, or input through input means. Alternatively, only the setting value 704 may be separately set.

Next, FIG. 8C will be described. FIG. 8C shows a state where the setting in FIG. 8A is changed. FIG. 8C shows a case where the control program 114 exclusively uses the CPU cores 1 and 2, the information program 115 exclusively uses the CPU cores 7 and 8, and shares the CPU cores 3 to 5. The shared CPU cores can be used when the computation processes for the programs 114 and 115 are insufficient. Alternatively, the amount of use can be changed according to the task priority.

For the shared CPU cores, use of boundary lines that are broken lines is useful because it clearly indicates the difference from that in FIG. 8B. However, to represent this difference, another representation may be adopted. For example, the background colors for exclusive and shared uses are changed with respect to each other. Alternatively, a process of applying different hatchings or the like may be adopted. Memory setting is similar to that in FIG. 8B. Accordingly, the description will be omitted. Among the LAN ports, the LAN1 is exclusively used by the control program 114, the LAN3 is exclusively used by the information program 115, and LANs 2 and 4 are shared by the control program 114 and the information program 115.

The attribute 701 represents whether change of the parameter value corresponding to the object parameter item with respect to any of the information programs 115 possibly affects execution (operation) of any of the control programs 114 or not. "A: SET CAREFULLY" means a possibility of adverse effects. "B: FREELY SETTABLE" means absence of adverse effects. Indication of the attribute 701 allows the user to easily know the items that do not affect the user.

The settable range 702 represents the range of the parameter value settable for the information programs 115 with respect to the object parameter item. The parameter value can be adjusted within the range. For at least one parameter item, the settable range 702 may represent a value for each information program 115. However, in the example in FIG. 7, for every parameter item, the value as a total for all the information programs 115 is represented. For example, the parameter item "the number of CPU CORES" can set which cores among the CPU cores 2 to 8 the information program 114 uses. If not specifically set, the CPU cores 4 to 8 are used as described in the default value 703. The settable range 702 corresponding to "MEMORY UPPER LIMIT" is the upper limit range of total amount of memory for all the information programs 115. In the example shown in FIG. 8B, for the information programs 115, the limit may be set to a value ranging from 16 to 256 MB. If the setting value 704 is not set, a value of 128 MB, which is the default value 703, is used. If the setting value 704 is set to 160 MB, 160 MB can be used. Accordingly, In the example shown in FIG. 8A, the information program 114 can sufficiently use the memory, thereby allowing the information program 114 to operate more stably.

For at least one parameter item, the settable range 702 can be automatically set or changed. When the range is automatically set, the control program 114 can set it with reference to the resource of the device or shared information. For example, based on the resources in use by the control program 114, the task management unit 110 can automatically set or change the settable range 702 for the information program 115. For example, when the control program 114 exclusively uses the LAN1 and LAN2 among the LAN ports and shares the LAN3, the settable range 702 of the available LAN port may be set to LAN3 and LAN4, and the settable range 702 of the exclusive LAN may be set to LAN4. In this case, if the LAN3 is set to be used exclusively by the information program 115, the control program 114 cannot use it. Accordingly, SET CAREFULLY is described in the attribute 701. If the settable range 702 of the available LAN port is set only to LAN4, the settable range 702 of the exclusive LAN port is only the LAN4. This means that the unavailable LAN port is automatically changed to a non-exclusive setting.

The parameter item "ROUTING SCHEME" is adopted by an OS shared implementation exemplified in FIG. 9. For example, referring to FIG. 9 to be described later, "Masquerade" means that a container 953 (an example of an execution environment) does not accept communication from the outside of the control apparatus 909. "Port forward" means that among communications from outside of the control apparatus 909, only communications to a certain port are accepted. "IP forward" means that an IP address dedicated for an information container 953B is additionally assigned to a physical network I/F (for example, the network I/F 213 in FIG. 1), and communications to which the IP address is designated are forwarded to the information program 115 in the information container 953B.

The parameter item "AVAILABLE LAN PORT" indicates the LAN port available by the information program 115. The parameter item "EXCLUSIVE LAN PORT" indicates the LAN port exclusively used by the information program 115. That is, the information program 115 shares the LAN ports 3 and 4 with the control program 114 by default, and is changed to a setting of exclusively using the LAN port 4.

The parameter value "SHARED FOLDER" represents the path to a shared folder, which is an example of the shared area. The default value 703 indicates that NOT SHARED. Accordingly, without being specifically set, a state with no shared folder is achieved.

The default value 703 represents a default value corresponding to the object parameter item. For example, according to the default value corresponding to the parameter item "LAN PORT", the parameter values "LAN3" and "LAN4" are set in the information program 115, and "LAN4" is set as the parameter value of the exclusive LAN port. That is, LAN3 is a shared device. LAN4 is a device exclusively used by the information program 115. As shown in FIG. 8A, the LAN ports are in a state where the control program exclusively uses one port, the information program exclusively uses one port, and the control program and the information program share two ports. This sharing is a case where a communication of the control program that does not necessarily require the real-time property, and the information program each use the LAN port.

For example, when one program uses the shared LAN port and the other program intends to use this port, the other program stands by until the communication by the one program is finished, and then the other program uses it. Exclusive use of the LAN port by the control program 114 is effective for use of real-time control communication. Shared use of the LAN port by the control program 114 and the information program 115 is effective for use of non-real-time communication, such as a general Ethernet communication. When the information program 115 communicates with the outside of the control apparatus 109, for example, the outside of the factory or the Internet, the apparatuses coupled to the control program 114 and the control apparatus 109 are allowed to be invisible from the outside of the control apparatus 109. Accordingly, it is effective in view of security.

As for each of the programs 114 and 115, as exemplified in FIG. 8A, with respect to each of one or more types of computing resources (e.g., the CPU core, memory, and LAN (an example of the I/O port)), the resource upper limit corresponding to the computing resource of the relevant type (each parameter item) is based on the resource boundary (a thick line in each of FIGS. 8A, 8B and 8C) defined for the computing resource of the relevant type. When the LAN is shared, representation is made by providing a boundary at an intermediate position for the sake of convenience. For each of the one or more types of computing resources, the resource boundary is a boundary defined by the following (x) and (y). The control program 114 is executed by the resource of (x) and thereafter, and the information program 115 is executed by the resource of (y) and thereafter, thereby allowing execution without affecting each program. Not only in a case with the number of cores of CPUs, but also in a case of a single core, the scheduling priority can be set. In a case with multiple CPU cores, scheduling can be achieved such that without setting the exclusive use of the CPU cores, the control program 115 can be executed at predetermined scan time. In this case, the plurality of cores can be effectively used.

(x) a resource upper limit of the relevant type of computing resource, this limit being a total resources that are the relevant type of computing resource available by all the control programs 114.

(y) a resource upper limit of the relevant type of computing resource, this limit being a total resources that are the relevant type of computing resource available by one or more information programs.

According to such a resource boundary, the real-time property is expected to be maintained. In FIGS. 8A, 8B and 8C, for the types of computing resources, gray bands residing to the left of the resource boundary mean total resources in use that are the total resources used by all the control programs 114. White bands residing to the left of the resource boundary represent margin resources related to the control programs 114 (the difference between the resource boundary and the total resources in use). That is, the gray bands indicate an actual use state, and the white bands indicate resources that are not used but can be used. On the other hand, for the types of computing resources, gray bands residing to the right of the resource boundary mean total resources in use that are the total resources used by all the information programs 115. White bands residing to the left of the resource boundary represent margin resources related to the information programs 115 (the difference between the resource boundary and the total resources in use). By displaying them in real-time or during debugging, the amount of resources in use can be identified, and the control programs 114 and the information programs 115 can be effectively executed according to the setting value 704.

As exemplified in FIGS. 8A, 8B and 8C, the task management unit 110, which controls execution of the plurality of programs 114 and 115, dynamically changes the resource boundary between at least one type of computing resource among the one or more types of computing resources. The change is performed, for example, when a predetermined event for changing the resource boundary occurs (e.g., when a request for changing the resource boundary issued by the user is received by the task management unit 110). Accordingly, for example, for the type of computing resource having sufficient margin resources for the control program 114 is subjected to resource boundary changing that reduces the resources for the control program 114 (e.g., see the type of computing resource "memory"). As described above, by flexibly changing the resource boundary, high throughput can be expected while the real-time property is maintained. That is, the real-time property and the high throughput can be expected to be concurrently achieved.

For at least one type of computing resource, when change of a resource boundary of the relevant type of computing resource is change of reducing the resource for the control programs 114, the task management unit 110 may perform the following (A) and (B). According to the following (A) and (B), even when the boundary change of reducing the resources for the control programs 114, in other words, even when the preliminary assumption for adding the information program 115 is changed, the real-time property can be expected to be maintained.
(A) stopping at least one of the one or more information programs 115.
(B) executing at least one of followings, for at least one control program 114.
(b1) changing the shared device (e.g., at least one of the I/O ports) allocated to the stopped information program 115, to a device exclusive to the relevant control program 114.
(b2) relatively increasing the task priority 303 of the relevant control program (i.e., performing at least one of increase in the task priority 303 of the relevant control program, and reduction in the task priority 303 of the stopped information program 115).

In the above description, although the platform where the control program 114 and the information program 115 coexist is the control apparatus 109 as a physical computer, as exemplified in FIG. 9, the same OS 952 can be adopted as another example. That is, the OS of the control program 114 and the OS of the information program 115 are common. Here again, for each of the plurality of programs 114 and 115, the execution management table 113 including a plurality of parameter values that define a range of operation of the program is set.

For control, generally, a high real-time property is required, and for information processing, generally, a high through-put is required. As an OS, generally, there is a dedicated OS (real-time OS) as an OS for control and a general-purpose OS as an OS for information processing.

Generally, a control program is executed by a computer equipped with the dedicated OS, and a computer equipped with the general-purpose OS is executed that has received information necessary for calculation of an information system from the computer equipped with the dedicated OS. Here, if the recent technology of the field of general-purpose computers is taken into consideration, it is conceivable that a configuration similar to the present invention can be obtained by executing the control program on the dedicated OS and executing the information program on the general-purpose OS. Consequently, when the control program and the information program coexist in the same computer, normally, a virtual machine technique that emulates a computing resource aggregate (hardware as a physical computing resource aggregate) is adopted. Specifically, for example, it is conceivable that a hypervisor generates a virtual machine equipped with the dedicated OS as a guest OS for the control program, generates a virtual machine equipped with the general-purpose OS as a guest OS for the information program, and the control program and the information program are executed on different virtual machines with different OSs from each other.

However, the virtual machine technique requires a host OS serving as a base of virtual machines in addition to guest OSs in the virtual machines. As a result, there are many management objects, and it is conceivable that management becomes complicated.

Even if an appliance is coupled to a computer, not all control programs and information programs of the computer can easily recognize the appliance. Processing for recognizing the appliance via a guest OS is necessary for each virtual machine. In other words, it is difficult for the control programs and the information programs to share a device.

According to study of the inventor of the present application, an OS (hereinafter referred to as a "real-time general-purpose OS" for convenience) having a real-time function capable of providing a required real-time property although it belongs to a general-purpose OS group is provided.

Therefore, it is conceivable to adopt the real-time general-purpose OS as the OS 952 on which the control program 114 and the information program 115 coexist as exemplified in FIG. 9.

However, when the control program 114 and the information program 115 coexist on the real-time general-purpose OS, there is a concern about deterioration in the real-time property of the control program 114. Specifically, for example, the real-time general-purpose OS has a scheduler, and is configured for an interruption to occur to the scheduler. If there is a real-time task (task corresponding to the control program 114) to be executed, the scheduler hands over control to the real-time task according to the task priority 303, whereas if there is no real-time task to be executed, the scheduler hands over control to a normal task (for example, a task corresponding to the information program 115). Even if there is a real-time task to be executed, the normal task is not stopped until predetermined processing for the normal task is finished. Consequently, start of the real-time task is delayed and as a result, the real-time property may be impaired.

Therefore, the OS 952 is adopted as the same platform of the control program 114 and the information program 115, and in the environment, the real-time property is maintained by adopting at least one of the above-described devises, for example, at least one of the following.

The above-described execution management table 113 is set. That is, parameter values determined for the purpose of maintaining the real-time property are set for each of the control program 114 and the information program 115.

To prevent reduction in real-time property that is achieved in exchange for facilitation of device sharing, the resource boundary as described above is set.

As setting of the parameter values, specifically, for example, the real-time property is maintained even if the control program 114 and the information program 115 coexist on the same OS 952 by combination of the parameter values 303-308 exemplified in FIG. 3. For example, the parameter values 303-308 are determined considering that a normal task is not stopped until the predetermined processing of the normal task is finished.

The throughput may be appropriately considered, and the resource boundary may be dynamically changed by an execution control program 957, which is an example of a host program, for example. At this time, in a case where the change of the resource boundary is change of resource boundary that reduces the resources for the control program 114, the above-described (A) and (B) may be performed by the execution control program 957, for example.

A control apparatus 909 in FIG. 9 is, for example, as follows.

The OS 952 is executed on a physical resource aggregate 951 of the control apparatus 909. A container 953 conforming to container-type virtualization is adopted as a program execution environment on the OS 952. That is, programs are set in the container 953 and are performed in units of the container 953. As the container 953, for example, there are two types of containers of a control container 953A and an information container 953B.

The control container 953A is a container where the control programs 114 are stored and executed. The control programs 114 may be executed, for example, on a software PLC-system runtime 961. The control programs 114 may perform control-system communication. Note that the control-system communication may be serial or parallel wired or wireless communication.

The information container 953B is a container where the information programs 115 are stored and executed. At least one information program 115 can perform information-system communication.

As programs executed by the control apparatus 909, in addition to the programs 114 and 115, there are other programs, for example, a web server program 956 and an execution control program 957. The web server program 956 and the execution control program 957 are both examples of host programs executed outside the container 953. The execution control program 957 may be a container engine that performs generation, deletion, or the like of the container 953. The task management unit 110 may be implemented by executing the web server program 956 and the execution control program 957.

The web server program 956 is a program for functioning as a web server. The web server program 956 communicates with each (client) of the management user computers 151M and the general user computers 151G. The web server program 956 is an example of a user interface program that receives setting of parameter values for a container where at least one of the one or more information programs 115 is stored.

The execution control program 957 controls execution of the container 953 (to be precise, a program in the container 953) on the basis of a plurality of parameter values set for the program in the container 953.

As described above, although the present invention made by the inventor has been specifically described on the basis of the embodiments of the invention, it goes without saying that the present invention is not limited to the embodiments of the invention, and various changes can be made without departing from the scope of the gist.

The present invention is not limited to the above-described embodiments and various variations are included. For example, the embodiments have been described in detail for easy understanding of the present invention, and the invention is not necessarily limited to the one having all the configurations described.

It is possible to replace part of the configuration of one embodiment with the configuration of the other embodiment, and it is also possible to add the configuration of one embodiment to the configuration of the other embodiment.

For example, the control apparatus may be an apparatus referred to as "industrial control apparatus".

REFERENCE SIGNS LIST

101 Program distribution apparatus
102 Program distribution unit
103 Execution management generation unit
104 Program management database
105 Control program
106 Information program
109 Control apparatus
110 Task management unit
110 Execution management table
114 Control program
115 Information program

The invention claimed is:

1. A control apparatus that accesses at least one I/O port of one or more I/O ports coupled to one or more control object apparatuses to control operation of a control object apparatus coupled to the I/O port, the control apparatus comprising:

a storage unit that serves as a base of one or more shared areas; and a processor unit that executes a plurality of programs, wherein the plurality of programs include one or more information programs in addition to one or more control programs, wherein for each of the one or more shared areas, the relevant shared area is a storage area that at least one control program among the one or more control programs, and at least one information program among the at least one or more information programs can access, and is a storage area that stores shared information including at least one of information related to an I/O port accessed by the relevant control program, and information related to the relevant control program, wherein each of the one of more control programs is a program that performs scan operation of outputting control information on a control object apparatus coupled to the I/O port accessed for controlling the control object apparatus with respect to the control program, to the I/O port, and wherein each of the one or more information programs is a program that performs information processing that does not include scan operation.

2. The control apparatus according to claim 1, wherein the storage unit stores execution management information, wherein the execution management information includes a plurality of parameter values that define a range of operation of a relevant program for each of the plurality of programs, and wherein for each of the plurality of programs, the plurality of parameter values include at least one of:

priority of the relevant program;

one or more resource upper limits corresponding to one or more types of computing resources; and an exclusive/shared device representing that which I/O port of one or more I/O ports available to the relevant program is an I/O port exclusive to the relevant program and which I/O port is an I/O port that can be shared by two or more programs including the relevant program.

3. The control apparatus according to claim 2, wherein with respect to each of the plurality of programs, for each of the one or more types of computing resources, a resource upper limit corresponding to the relevant type of computing resource is based on a resource boundary defined for the relevant type of computing resource, and wherein for each of the one or more types of computing resources, the resource boundary is a boundary defined by the following (x) and (y):

(x) a resource upper limit of the relevant type of computing resource, this limit being a total resources that are the relevant type of computing resource available by all the control programs, and (y) a resource upper limit of the relevant type of computing resource, this limit being a total resources that are the relevant type of computing resource available by all the information programs.

4. The control apparatus according to claim 3, further comprising a task management unit that controls execution of the plurality of programs, wherein the task management unit dynamically changes a resource boundary of at least one type of computing resource among the one or more types of computing resources.

5. The control apparatus according to claim 4, wherein for at least one type of computing resource among the one or more types of computing resources, when change of a resource boundary of the relevant type of computing resource is change of reducing the resource for the one or more control programs, the task management unit stops at least one of the one or more information programs, and executes at least one of followings, for at least one control program:

changing at least one of I/O ports allocated to the stopped information program or programs, to an I/O port exclusive to the relevant control program, and relatively increasing priority of the relevant control program.

6. The control apparatus according to claim 1, wherein the one or more control programs, and the one or more information programs share a common OS (Operating System), wherein for each of the plurality of programs, a plurality of parameter values that define a range of operation of the relevant program are set, and wherein for each of the plurality of programs, the plurality of parameter values include an exclusive/shared device representing that which I/O port of one or more I/O ports available to the relevant program is an I/O port exclusive to the relevant program and which I/O port is an I/O port that can be shared by two or more programs including the relevant program.

7. The control apparatus according to claim 6, wherein for each of the one or more types of computing resources, a resource boundary that is a boundary defined by following (x) and (y) is configured:

(x) a resource upper limit of the relevant type of computing resource, this limit being a total resources that are the relevant type of computing resource available by all the control programs, and (y) a resource upper limit of the relevant type of computing resource, this limit being a total resources that are the relevant type of computing resource available by all the information programs.

8. The control apparatus according to claim 7, wherein the one or more control programs are executed in one or more execution environments provided on the OS, wherein the one or more information programs are executed in one or more execution environments that are provided on the OS and are different from the one or more execution environments in which the one or more control programs are executed, and wherein on the OS, a host program that is at least one program executed separately from the one or more execution environments in which the one or more control programs are executed, and from the one or more execution environment in which the one or more information programs are executed, dynamically changes the resource boundary of at least one type of computing resource among the one or more types of computing resources.

9. The control apparatus according to claim 8, wherein for at least one type of computing resource among the one or more types of computing resources, when change of a resource boundary of the relevant type of computing resource is change of reducing the resource for the one or more control programs, the host program stops at least one of the one or more information programs, and executes at least one of followings, for at least one control program:

changing at least one of I/O ports allocated to the stopped information program or programs, to an I/O port exclusive to the relevant control program, and relatively increasing priority of the relevant control program.

10. A control method comprising:

managing one or more shared areas; and executing a plurality of programs including one or more control programs and one or more information programs, wherein for each of the one or more shared areas, the relevant shared area is a storage area that at least one control program among the one or more control programs, and at least one information program among the at least one or more information programs can access, and is a storage area that stores shared information including at least one of information related to an I/O port accessed by the relevant control program, and information related to the relevant control program, wherein each of the one of more control programs is a program that performs scan operation of outputting control information on the relevant control object apparatus coupled to the I/O port accessed for controlling a control object apparatus with respect to the control program, to this I/O port, and wherein each of the one or more information programs is a program that performs information processing that does not include scan operation.

* * * * *